United States Patent
Rawson-Harris et al.

(10) Patent No.: US 9,045,903 B2
(45) Date of Patent: Jun. 2, 2015

(54) POLE ASSEMBLY WITH TRANSITION RING

(76) Inventors: Douglas Rawson-Harris, Palm Beach (AU); Andrew Crick, Balmain (AU)

( * ) Notice: Subject to any disclaimer, the term of this patent is extended or adjusted under 35 U.S.C. 154(b) by 0 days.

(21) Appl. No.: 14/119,067

(22) PCT Filed: May 21, 2012

(86) PCT No.: PCT/AU2012/000573
§ 371 (c)(1),
(2), (4) Date: Mar. 19, 2014

(87) PCT Pub. No.: WO2012/159160
PCT Pub. Date: Nov. 29, 2012

(65) Prior Publication Data
US 2014/0190121 A1  Jul. 10, 2014

(30) Foreign Application Priority Data

May 24, 2011  (AU) ................ 2011902001

(51) Int. Cl.
*E01F 9/011* (2006.01)
*E04C 3/30* (2006.01)
*E04C 3/32* (2006.01)
*F16J 15/02* (2006.01)
*F16J 15/06* (2006.01)

(52) U.S. Cl.
CPC ............... *E04C 3/32* (2013.01); *F16J 15/028* (2013.01); *E01F 9/011* (2013.01); *F16J 15/068* (2013.01)

(58) Field of Classification Search
CPC ......... E02D 27/42; E02D 27/32; E02D 27/14; E02D 35/005; E02D 13/004; E02D 27/12; E02D 5/28; E02D 5/44; E02D 5/46; E02D 5/48; E02D 5/54; E02D 5/56; E02D 5/66; E02D 5/72; E02D 5/80; E02D 5/801; F16J 15/028; F16J 15/068; E04C 3/30; E04C 3/32
USPC .......... 52/169.9, 169.1, 167.7, 167.6, 169.13, 52/835–834
See application file for complete search history.

(56) References Cited

U.S. PATENT DOCUMENTS 3,225,734 A * 12/1965 Bule .............................. 116/173
5,040,251 A *  8/1991 Hanford ........................... 4/496
6,176,062 B1 *  1/2001 Fayle .............................. 52/835

(Continued)

FOREIGN PATENT DOCUMENTS

| JP | 2006132117 | 5/2006 |
|---|---|---|
| WO | WO9006411 | 6/1990 |
| WO | WO2004007844 | 1/2004 |

*Primary Examiner* — Jeanette E Chapman
(74) *Attorney, Agent, or Firm* — Welsh Flaxman & Gitler LLC

(57) ABSTRACT

A sealing arrangement for a pole assembly having a tubular base, a tubular upper mast of smaller diameter, and a cladding. An end of the upper mast is inserted within an end of the base and a portion of the base overlaps the upper mast and is fastened thereto, with the cladding surrounding the base. The sealing arrangement comprises a transition ring and a seal assembly. The transition ring surrounds a portion of the base, upper mast and cladding. The transition ring having an internal downwardly facing surface, and the seal assembly is disposed within said transition ring to seal between the external surface of the upper mast and the transition ring. The seal assembly comprising a sealing plate and a seal disposed between the downwardly facing surface and the sealing plate, and the sealing action of the seal assembly is actuated by the sealing plate squeezing said seal.

6 Claims, 7 Drawing Sheets

(56) References Cited

U.S. PATENT DOCUMENTS 8,171,674 B2 * 5/2012 Bagepalli et al. .............. 52/40
2002/0050112 A1 * 5/2002 Koch et al. .............. 52/651.07
2006/0150572 A1 * 7/2006 Rawson-Harris ............ 52/736.2
2012/0211978 A1 * 8/2012 Gardiner ...................... 285/382

* cited by examiner

POLE ASSEMBLY WITH TRANSITION RING

TECHNICAL FIELD

This invention relates to a pole assembly. The pole is of the type that may support items such as street lights, signs, traffic signals, pedestrian signals, security cameras, flags, banners and the like. In particular the invention is described with reference to a sealing arrangement using a transition ring between a base and upper mast of light pole assembly.

BACKGROUND

Poles for the mounting of street lights, signs, pedestrian signals, traffic signals, security cameras, banners and the like are well known and generally take the form of structural columns with reach arms and brackets fitted at various positions to support lights, signs and other ancillary items at desired heights and positions. These poles are generally made from hard wood, reinforced concrete or from tubular galvanised steel or aluminium. Tubular poles have the advantage of the ability to hide switch gear, cables and the like inside the pole.

Pole assemblies having a tubular upper mast that slides into a tubular base are known. In some of these arrangements, the base has a plurality of longitudinal channels that project into corresponding longitudinal channels in the upper mast, and the upper mast is secured to the base by long bolts that extend across the base, through the upper mast. A problem with this type of pole assembly is that water or dirt may enter the interior of the pole through the gaps between the upper mast and the base at the join (i.e. the transition) between them. Prior art methods of sealing this join include sealing caps or sealant. However, these methods are not ideal and may be unreliable.

The present invention seeks to overcome at least one of the disadvantages of the prior art, or at least provide a useful alternative.

SUMMARY OF INVENTION

In a first aspect, the present invention consists of a pole assembly comprising a base, an upper mast and a cladding, said base comprising a first tubular member of substantially constant cross section, and said upper mast comprising a second tubular member of substantially constant cross section smaller in cross section than said first tubular member, and in use to assemble said pole assembly a free end of said second tubular member is inserted within a free end of said first tubular member so that a portion of said first tubular member overlaps said second tubular member allowing for a plurality of fasteners to removably secure said second tubular member to said first tubular member, and said cladding surrounds said first tubular member and said fasteners, wherein a transition ring is disposed around a portion of said first and second tubular members and said cladding at said free end of said first tubular member, said transition ring having an internal downwardly facing surface, and a seal assembly is disposed within said transition ring to seal between the external surface of said second tubular member and said transition ring, said seal assembly comprising a sealing plate and a seal, said seal being disposed between said downwardly facing surface and said sealing plate, and the sealing action of said seal assembly is actuated by said sealing plate squeezing said seal.

Preferably, a plurality of screws, each of which pass through said seal into said sealing plate, are used to actuate the sealing plate to squeeze said seal.

Preferably, said first tubular member comprises a plurality of first longitudinally extending channels that form corresponding longitudinal projections in its interior, and said second tubular member comprises a plurality of second longitudinally extending channels, and wherein said longitudinal projections project into said second longitudinally extending channels, when said second tubular member is inserted into said first tubular member.

Preferably, said transition ring has a plurality of spaced apart steps, each step projecting into one of said second longitudinally extending channels from the bottom of a recess in said transition ring that open to the top of said transition ring, said downwardly facing surface including the underside of said steps. Preferably, each said screw passes through a hole in one of said steps, and said screws are tightened from the outside of said transition ring.

Preferably, each of said fasteners comprise a bolt that passes through a hole in the bottom of one of said first longitudinally extending channels, and a corresponding hole in the bottom of one of said second longitudinally extending channels, and a nut disposed inside said second tubular member. Preferably, said first tubular member has an access hole to enable access to tighten said fasteners.

In a second aspect, the present invention consists of a sealing arrangement for a pole assembly, said pole assembly comprising a base of substantially constant cross section, an upper mast of substantially smaller constant cross section and a cladding, a free end of said upper mast being inserted within a free end of said base so that a portion of said base overlaps said upper mast and said upper mast is fastened to said base, and said cladding surrounds said base, said sealing arrangement comprising a transition ring and a seal assembly, said transition ring surrounding a portion of said base and upper mast and said cladding at said free end of said base, said transition ring having an internal downwardly facing surface, and said seal assembly is disposed within said transition ring to seal between the external surface of said upper mast and said transition ring, said seal assembly comprising a sealing plate and a seal, said seal being disposed between said downwardly facing surface and said sealing plate, and the sealing action of said seal assembly is actuated by said sealing plate squeezing said seal.

Preferably said base comprises a plurality of first longitudinally extending channels that form corresponding longitudinal projections in its interior, and said upper mast comprises a plurality of second longitudinally extending channels, and wherein said longitudinal projections project into said second longitudinally extending channels, when said upper mast is inserted into said base.

Preferably said transition ring has a downwardly facing internal surface and a plurality of spaced apart steps, each step projecting into one of said second longitudinally extending channels from the bottom of a recess in said transition ring that open to the top of said transition ring, said downwardly facing surface including the underside of said steps.

Preferably a plurality of screws, each of which pass through said seal into said sealing plate, are used to actuate the sealing plate, and said screws are tightened from outside said transition ring.

Preferably said seal is made of a resilient material and shaped as a thin ring with a plurality of equispaced inwardly projecting tabs.

Preferably said sealing plate is made from a stiff material and has a shape similar to said seal.

In a third aspect, the present invention consists of a sealing arrangement for a pole assembly, said pole assembly comprising a tubular base, a tubular upper mast of smaller diameter inserted within a free end of said base and fastened thereto, and cladding surrounding said base, and wherein said sealing arrangement comprises a transition ring and a seal assembly used to seal the transition between said base and said upper mast, said transition ring surrounding a portion of said base and upper mast and said cladding at said free end of said base, said transition ring having an internal downwardly facing surface, and said seal assembly is disposed within said transition ring to seal between the external surface of said upper mast and said transition ring, said seal assembly comprising a sealing plate and a seal, said seal being disposed between said downwardly facing surface and said sealing plate, and the sealing action of said seal assembly is actuated by said sealing plate squeezing said seal such that it bulges inwardly to seal between the external surface of said upper mast and said transition ring, and wherein the friction between said seal and the external surface of said upper mast keeps transition ring in position.

Preferably a plurality of screws, each of which pass through said seal into said sealing plate, are used to actuate the sealing plate to squeeze said seal, and wherein in use said seal and said sealing plate can be pre-assembled by fitting said plurality screws thereto, so that said sealing arrangement can be supplied ready to slide onto said upper mast, and final tightening of said screws is all that is required to complete fitting of said transition ring.

DESCRIPTION OF PREFERRED EMBODIMENTS

Figure 1:
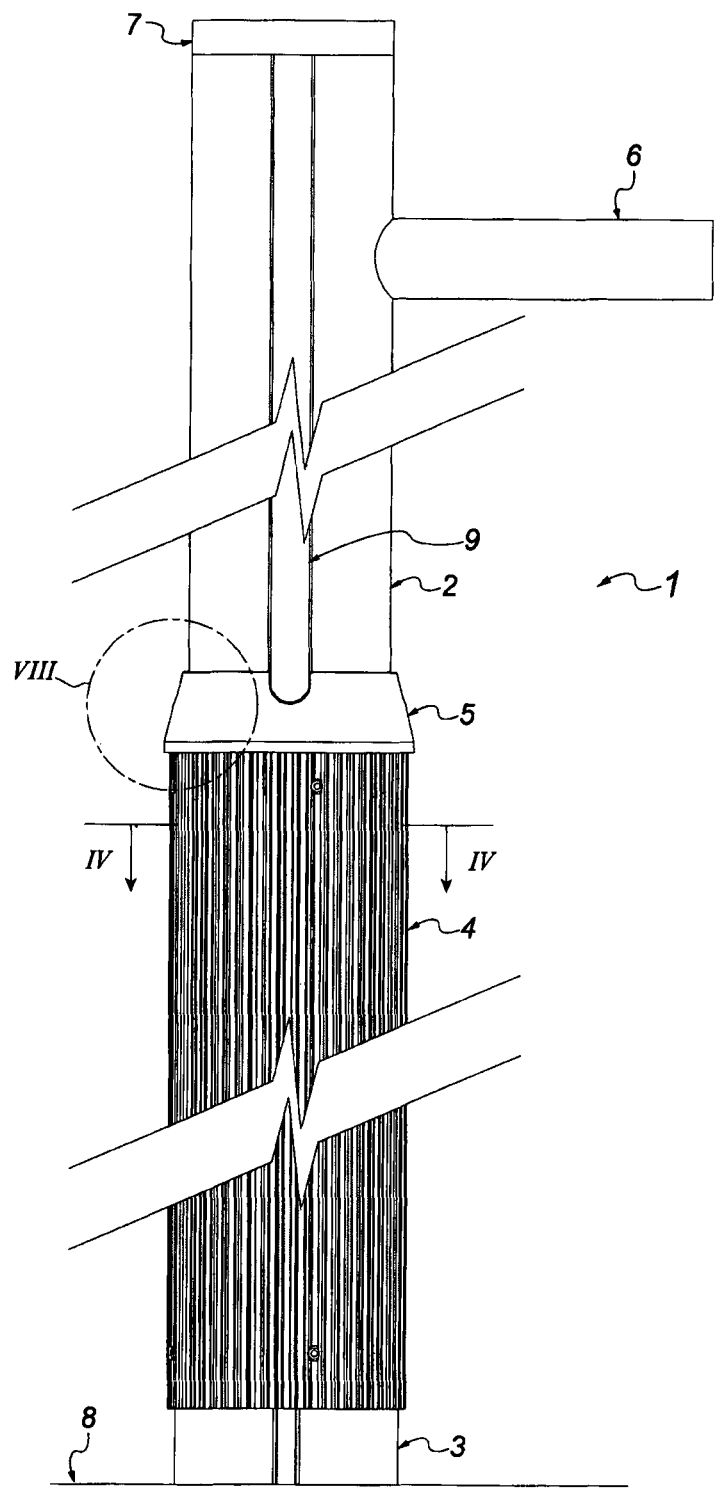
FIG. 1 is an elevation view of a pole assembly in accordance with the present invention.

FIGS. 1 to 9 depict a pole assembly 1 in accordance with the present invention. In this embodiment, pole assembly 1 is a light pole that has a light arm 6 to support a light (not shown). Pole assembly 1 comprises an elongate base 3 and an elongate upper mast 2, above base 3. Base 3 is attached to the ground 8 by being set in concrete or some other suitable means of attachment, such as a base plate (not shown) attached to base 3 and bolted to ground 8. Light arm 6 is attached to upper mast 2 near its top, and a top cap 7 covers the upper end of upper mast 2.

Figure 2:
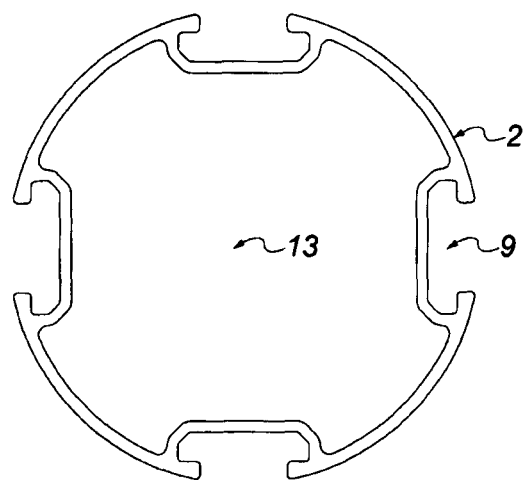
FIG. 2 is a cross section of the upper mast of the pole assembly shown in FIG. 1.
Figure 3:
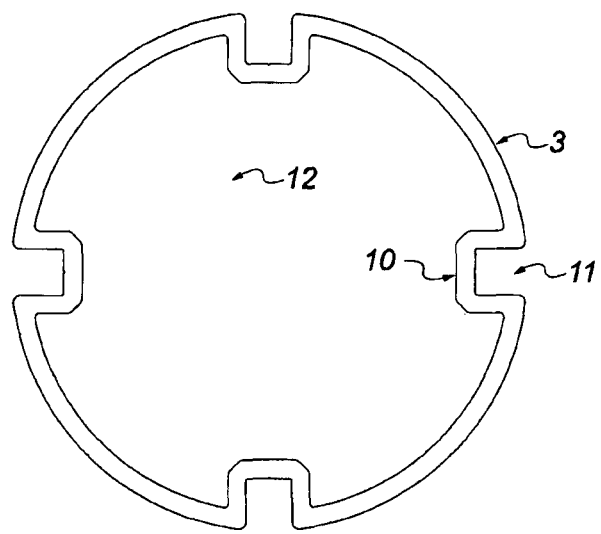
FIG. 3 is a cross section of the base of the pole assembly shown in FIG.
Figure 4:
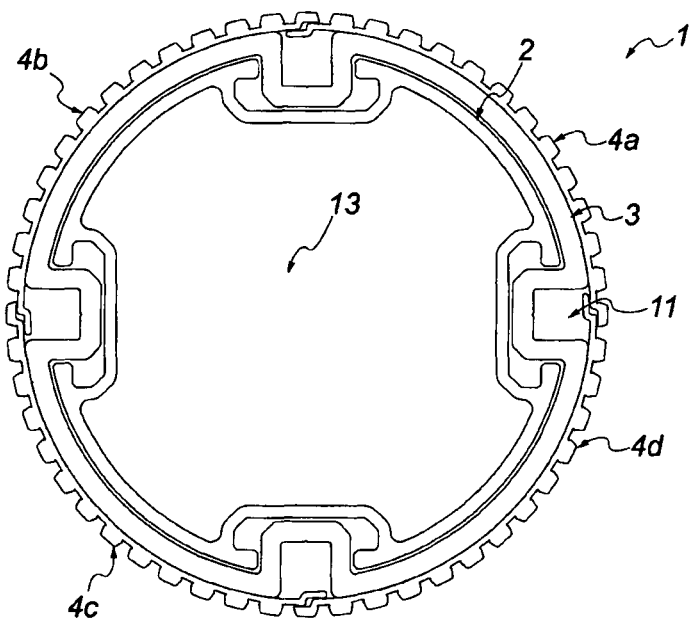
FIG. 4 is a cross section through IV-IV of the pole assembly shown in FIG. 1.

Upper mast 2 and base 3 are both tubular members, having hollow interiors 13 and 12 respectively, and each has a substantially constant cross section along its length, as shown in FIGS. 2 and 3. Upper mast 2 has a smaller cross section than base 3 such that upper mast 2 can slide into the hollow interior 12 of base 3, as can be seen in FIG. 4. The exterior of base 3 is substantially circular in cross section with four equispaced longitudinal channels 11 that form four corresponding longitudinal projections 10 in its interior 12. The exterior of upper mast 2 is also substantially circular in cross section with four equispaced longitudinal channels 9. Longitudinal projections 10 fit and project into channels 9 when upper mast 2 is slid into base 3. Upper mast 2 and base 3 are preferably aluminium extrusions.

Figure 5:
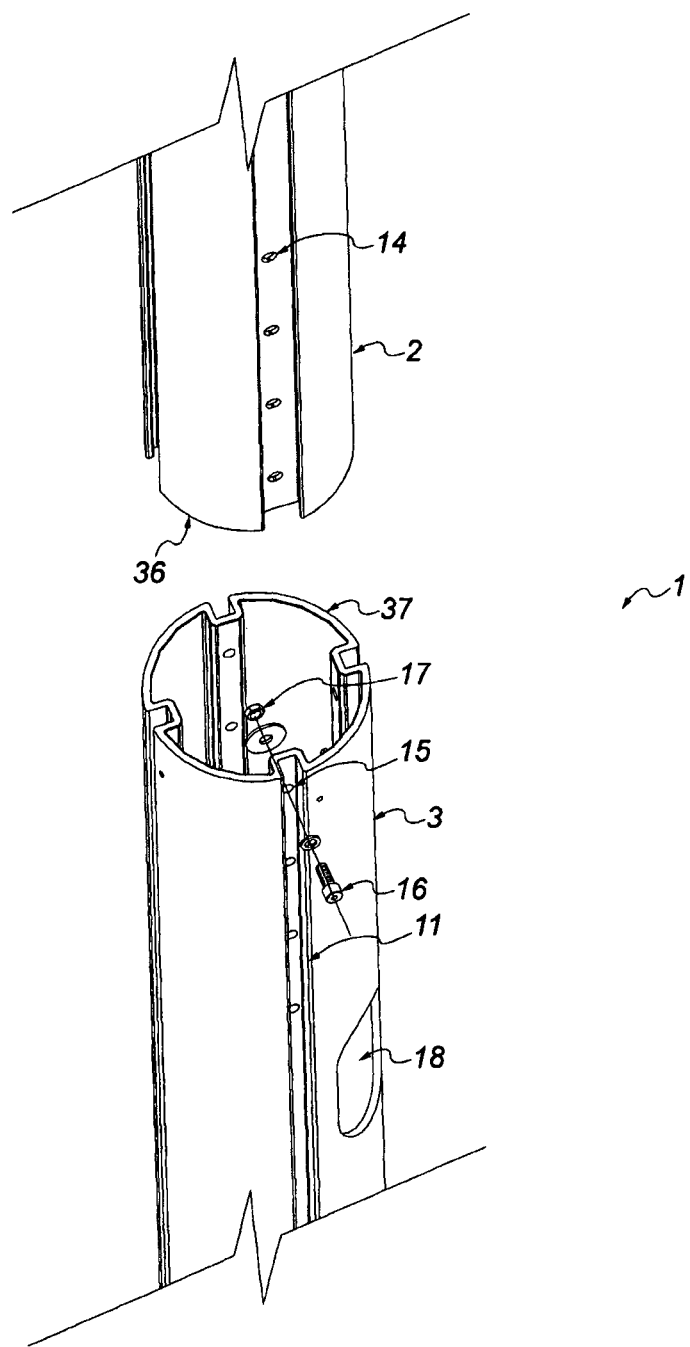
FIG. 5 is a perspective exploded view of the upper mast and the base of the pole assembly shown FIG. 1.

Referring to FIG. 5 in particular, pole assembly 1 is assembled by firstly inserting the lower free end 36 of upper mast 2 within the upper free end 37 of base 3 such that a portion of base 3 overlaps upper mast 2. In the portion of base 3 that overlaps upper mast 2, the bottom of each of the four channels 11 has four spaced apart through holes 15, making for a total of sixteen holes 15. The bottom of each of the four channels 9 in upper mast 2 has four through holes 14 that align with holes 15. Upper mast 2 and base 3 are removably secured together by sixteen fasteners, each fastener comprising a bolt 16 and a nut 17. Each bolt 16 passes through one of the holes 15 in base 3 and its aligned hole 14 in upper mast 2. Nuts 17 are disposed inside upper mast 2, and base 3 has an access hole 18 to enable hand access to assemble and tighten nuts 17 onto bolts 16.

Figure 6:
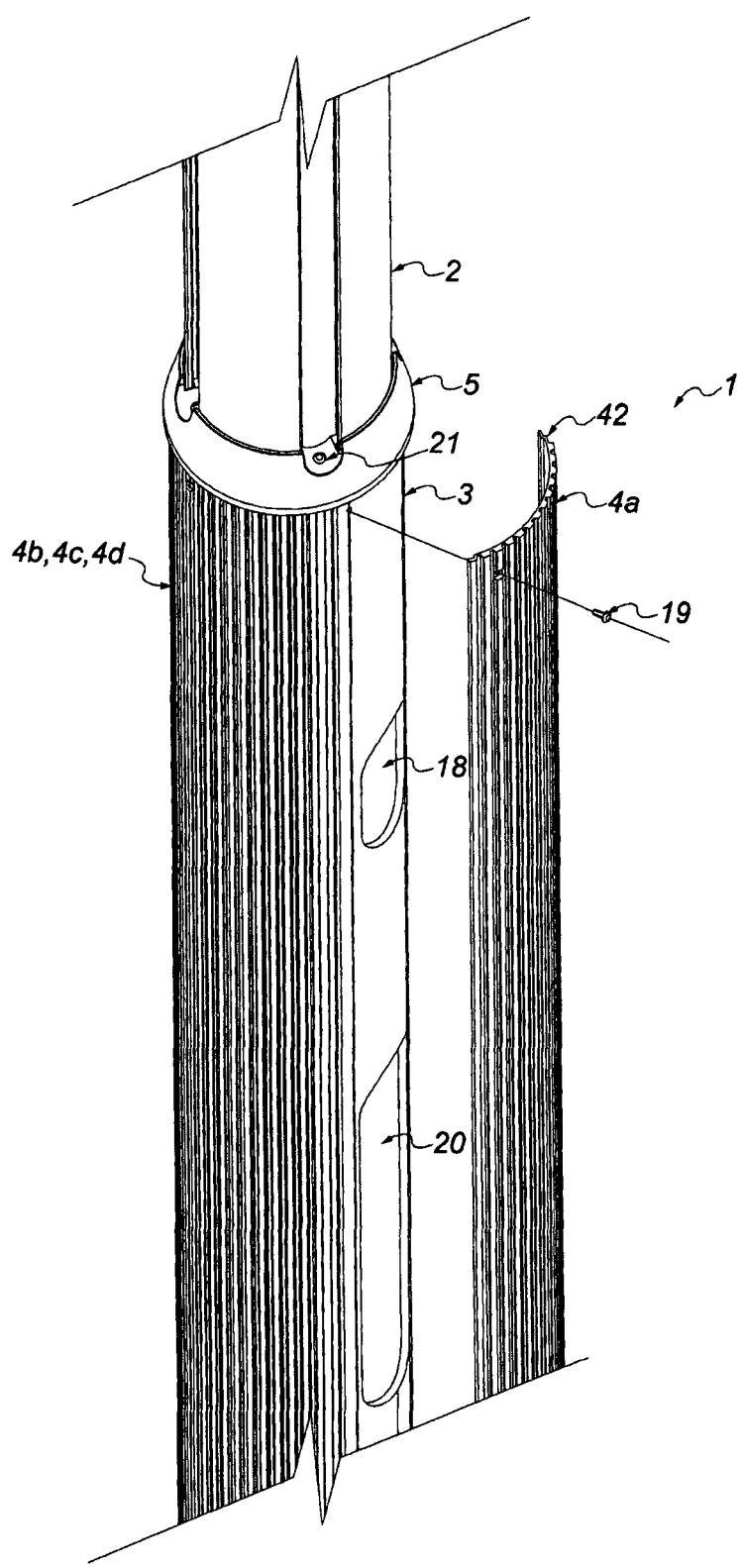
FIG. 6 is a partial perspective view of the pole assembly shown in FIG. 1 with a piece of its cladding removed.
Figure 7:
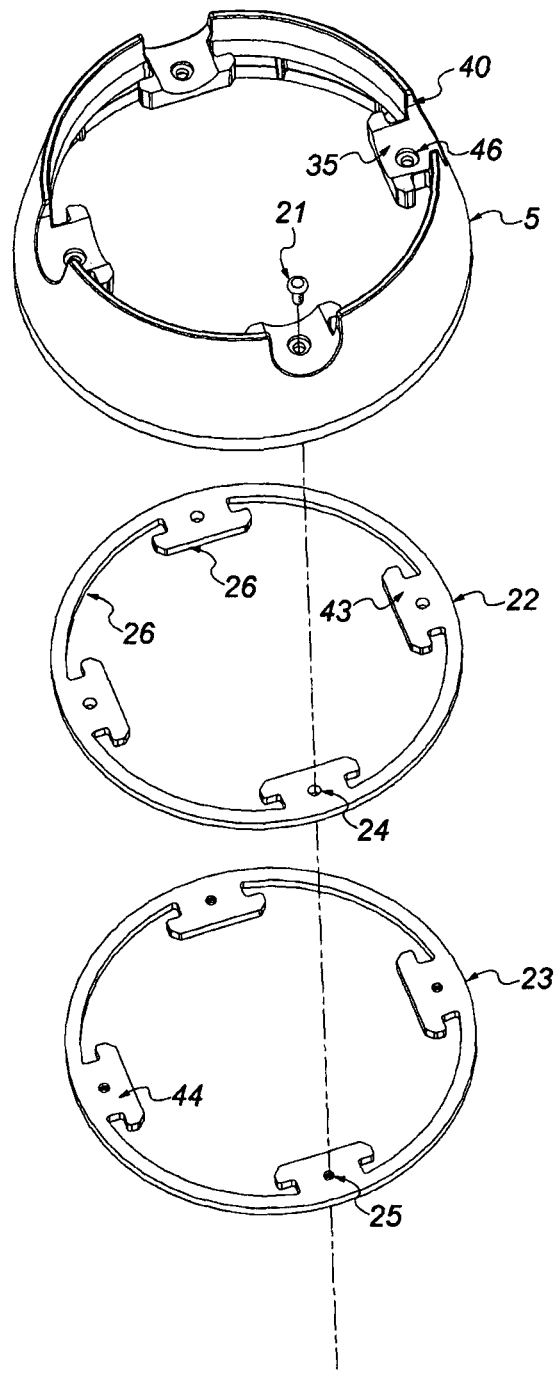
FIG. 7 is an exploded perspective view of the transition ring and seal assembly of the pole assembly shown in FIG. 1.

Referring to FIG. 6 in particular, base 3 has a hatch 20 to enable access to the interior of pole assembly 1 to connect or run electrical wiring. The exterior of base 3 is covered by a cladding 4 to improve the aesthetics of pole assembly 1 and cover channels 11. In this embodiment, cladding 4 comprises four longitudinally extending cladding pieces 4a-4d that surround base 3 and fasteners 16, 17. Each cladding piece 4a-4d has an arcuate cross section and is attached to base 3 by screws 19.

A transition ring 5 is disposed around (surrounds) a portion of upper mast 2, base 3 and cladding 4 at the free end 37 of base 3. The lower end 29 of transition ring 5 surrounds the upper free end 37 of base 3 and upper free end 42 of cladding 4. The exterior of transition ring 5 has a substantially frusto-conical shape with four equispaced "U" shaped recesses 40 that open to the upper end 41 of transition ring 5. Four equispaced steps 35 project inwardly from the bottom of each "U" shaped recess 40. Steps 35 are shaped to project and fit into the channels 9 of upper mast 2 with a small clearance. Transition ring 5 has an internal downward facing flat surface 45 in its lower portion 39. Surface 45 includes a ring that surrounds upper mast 2 and the undersides of steps 35.

A seal assembly, comprising a seal 22 and a sealing plate 23, is disposed within the lower portion 39 of transition ring 5, such that it is inside transition ring 5. Seal 22 is made from a flexible, resilient or elastomeric material, such as rubber or a suitable polymer. Seal 22 has the shape of a thin ring with four equispaced inwardly projecting tabs 43. Sealing plate 23 is made from metal or some other stiff material, and it has a similar shape to seal 22 with four inwardly projecting tabs 44. Seal 22 and sealing plate 23 both have a similar shape to downward facing surface 45 of transition ring 5, and the tabs 43 and 44 of seal 22 and sealing plate 23 both have a similar shape to, and align with, the steps 35 of transition ring 5.

Figure 8:
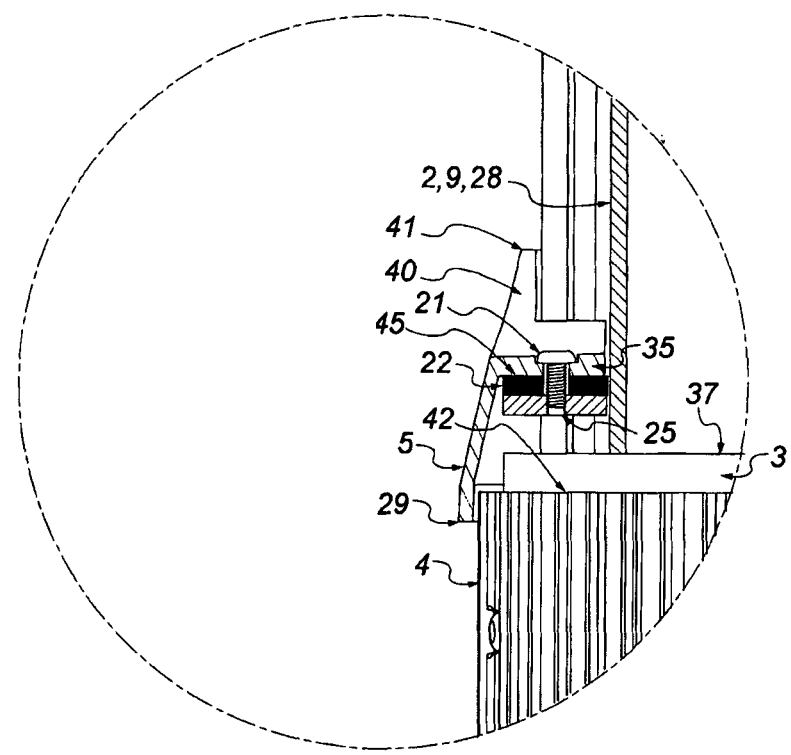
FIGS. 8 and 9 are detail longitudinal cross sections of the pole assembly shown in FIG. 1 as indicated by detail VIII in FIG. 1, with FIG. 8 showing its seal before it is squeezed and FIG. 9 showing its seal in a squeezed state.

Each step 35 of transition ring 5 has a counter-bored hole 46 through it, that aligns with a hole 24 through each tab 43 of seal 22 and a threaded hole 25 in each tab 44 of sealing plate 23. Four screws 21 attach seal assembly 22, 23 to transition ring 5. Screws 21 pass through holes 46 and 24 and screw into holes 25. FIG. 8 shows seal assembly 22, 23 attached to transition ring 5 without screws 21 being tightened. In this configuration there is a small clearance between the inside perimeter 26 of seal 22 and the external surface 28 of upper mast 2 such that transition ring 5 can be slid on to upper mast 2 and positioned as required.

Figure 9:
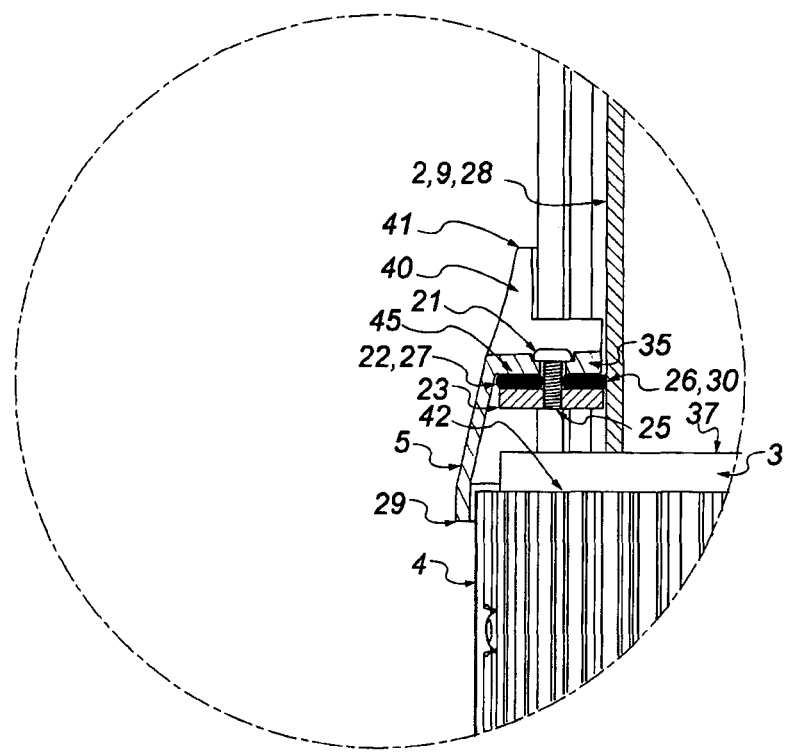

FIG. 9 shows transition ring 5 and seal assembly 22, 23 in their final in use positions. In this configuration, screws 21 are tightened from the outside of transition ring 5, which squeezes seal 22 between sealing plate 23 and internal surface 45 of transition ring 5. Seal 22 thereby bulges inwardly to engagingly seal between the external surface 28 of upper mast 2 and transition ring 5, as indicated by reference numeral 30. The friction between the squeezed seal 22 and the external surface 28 of upper mast 2 also keeps transition ring 5 in position.

Seal assembly 22, 23 seals water, dirt and other contaminants from running down upper mast 2, through transition ring 5, and into the interior 13 of base 3. An advantage of this arrangement is that its seal 22 is not exposed to the elements. A further advantage is that transition ring 5, seal 22 and sealing plate 23 can be pre-assembled by fitting screws 21 without tightening them, and so the assembly can be supplied without any loose fasteners, and the assembly as supplied is ready to slide onto upper mast 2 and final tightening of screws 21 is all that is required to complete the fitting of transition ring 5. A further advantage is that screws 21 can be tightened from the outside of transition ring 5 once it is in its final position.

The terms "comprising" and "including" (and their grammatical variations) as used herein are used in an inclusive sense and not in the exclusive sense of "consisting only of".

The invention claimed is:

1. A pole assembly comprising a base, an upper mast and a cladding,
    said base comprising a first tubular member of substantially constant cross section,
    and said upper mast comprising a second tubular member of substantially constant cross section smaller in cross section than said first tubular member,
    and in use to assemble said pole assembly a free end of said second tubular member is inserted within a free end of said first tubular member so that a portion of said first tubular member overlaps said second tubular member allowing for a plurality of fasteners to removably secure said second tubular member to said first tubular member,
    and said cladding surrounds said first tubular member and said fasteners,
    wherein a transition ring is disposed around a portion of said first and second tubular members and said cladding at said free end of said first tubular member,
    said transition ring having an internal downwardly facing surface,
    and a seal assembly is disposed within said transition ring to seal between the external surface of said second tubular member and said transition ring,
    said seal assembly comprising a sealing plate and a seal,
    said seal being disposed between said downwardly facing surface and said sealing plate,
    and the sealing action of said seal assembly is actuated by said sealing plate squeezing said seal;
    wherein said first tubular member comprises a plurality of first longitudinally extending channels that form corresponding longitudinal projections in its interior, and said second tubular member comprises a plurality of second longitudinally extending channels, and wherein said longitudinal projections project into said second longitudinally extending channels when said second tubular member is inserted into said first tubular member,
    and said transition ring has a plurality of spaced apart steps, each step projecting into one of said second longitudinally extending channels from the bottom of a recess in said transition ring that open to the top of said transition ring, said downwardly facing surface including the underside of said steps.

2. A pole assembly as claimed in claim 1, wherein a plurality of screws, each of which pass through said seal into said sealing plate, are used to actuate the sealing plate to squeeze said seal.

3. A pole assembly as claimed in claim 1, wherein each said screw passes through a hole in one of said steps, and said screws are tightened from the outside of said transition ring.

4. A pole assembly comprising a base, an upper mast and a cladding, said base comprising a first tubular member of substantially constant cross section,
    and said upper mast comprising a second tubular member of substantially constant cross section smaller in cross section than said first tubular member,
    and in use to assemble said pole assembly a free end of said second tubular member is inserted within a free end of said first tubular member so that a portion of said first tubular member overlaps said second tubular member allowing for a plurality of fasteners to removably secure said second tubular member to said first tubular member,
    and said cladding surrounds said first tubular member and said fasteners,
    wherein a transition ring is disposed around a portion of said first and second tubular members and said cladding at said free end of said first tubular member,
    said transition ring having an internal downwardly facing surface,
    and a seal assembly is disposed within said transition ring to seal between the external surface of said second tubular member and said transition ring,
    said seal assembly comprising a sealing plate and a seal,
    said seal being disposed between said downwardly facing surface and said sealing plate, and the sealing action of said seal assembly is actuated by said sealing plate squeezing said seal;
    wherein said first tubular member comprises a plurality of first longitudinally extending channels that form corresponding longitudinal projections in its interior, and said second tubular member comprises a plurality of second longitudinally extending channels, and
    wherein said longitudinal projections project into said second longitudinally extending channels, when said second tubular member is inserted into said first tubular member,
    and wherein each of said fasteners comprise a bolt that passes through a hole in the bottom of one of said first longitudinally extending channels, and a corresponding hole in the bottom of one of said second longitudinally extending channels, and a nut disposed inside said second tubular member.

5. A pole assembly as claimed in claim 4, wherein said first tubular member has an access hole to enable access to tighten said fasteners.

6. A pole assembly as claimed in claim 4, wherein a plurality of screws, each of which pass through said seal into said sealing plate, are used to actuate the sealing plate to squeeze said seal.

* * * * *